United States Patent [19]
Iwase

[11] Patent Number: 5,276,803
[45] Date of Patent: Jan. 4, 1994

[54] IMAGE SIGNAL PROCESSING CIRCUIT HAVING A MULTIPLE PORT MEMORY

[75] Inventor: Seiichiro Iwase, Kanagawa, Japan

[73] Assignee: Sony Corporation, Tokyo, Japan

[21] Appl. No.: 643,362

[22] Filed: Jan. 22, 1991

[30] Foreign Application Priority Data

Jan. 26, 1990 [JP] Japan ................................. 2-16725

[51] Int. Cl.$^5$ ............................................. G06F 15/20
[52] U.S. Cl. .................................... 395/164; 395/163; 365/230.05
[58] Field of Search ............... 395/162–164, 166, 425, 400, 364/DIG. 1, DIG. 2; 365/230.05, 230.03

[56] References Cited

U.S. PATENT DOCUMENTS

| | | | |
|---|---|---|---|
| 4,791,580 | 12/1988 | Sherrill et al. | 395/164 |
| 4,823,281 | 4/1989 | Evangelisti et al. | 395/164 |
| 4,941,107 | 7/1990 | Hasebe | 395/164 |

OTHER PUBLICATIONS

NEC Research and Development No. 93, Apr., 1989, Tokyo JP pp. 63–71 M. Iwashita et al. "A Fine Grained data Flow Machine and Its Concurrent Mechanism" pp. 63–69 chpts. 1–4, FIGS. 1–5, 9.

IEEE International Solid State Circuits Conference 1985, New York US pp. 38–39 S. Ishimoto et al. A 256K Dual Port Memory.

Proceedings of the 1988 International Conference in Parallel Processing vol. 1. Aug. 1988, University Park, USA pp. 452–461 M. H. Sunwoo, J. K. Aggarwal "Flexibly Coupled Multiprocessors for Image Processing".

*Primary Examiner*—Dale M. Shaw
*Assistant Examiner*—Kee M. Tung
*Attorney, Agent, or Firm*—William S. Frommer; Alvin Sinderbrand

[57] ABSTRACT

A circuit has a multiple port memory and a plurality of processor elements having write and/or read addresses connected to addresses of the multiple port memory. A register, a delay circuit and/or a buffer memory may be formed among the processor elements in dependence on the connections of the write and read addresses.

5 Claims, 11 Drawing Sheets

IMAGE SIGNAL PROCESSING CIRCUIT HAVING A MULTIPLE PORT MEMORY

BACKGROUND OF THE INVENTION

1. Field of the Invention

The present invention relates to an image signal processing circuit and, more particularly, to an image signal processing circuit with a multiple port memory.

2. Description of the Prior Art

An image processor typically includes a large number of processor elements (hereinafter named PE's) which, for example, may include digital computation circuits and which are arranged in a parallel formation. Several types of architectures have been proposed for use with the image processors, such as the systolic array method shown in FIG. 1 and the crossbar switch method shown in FIG. 2.

Figure 1:
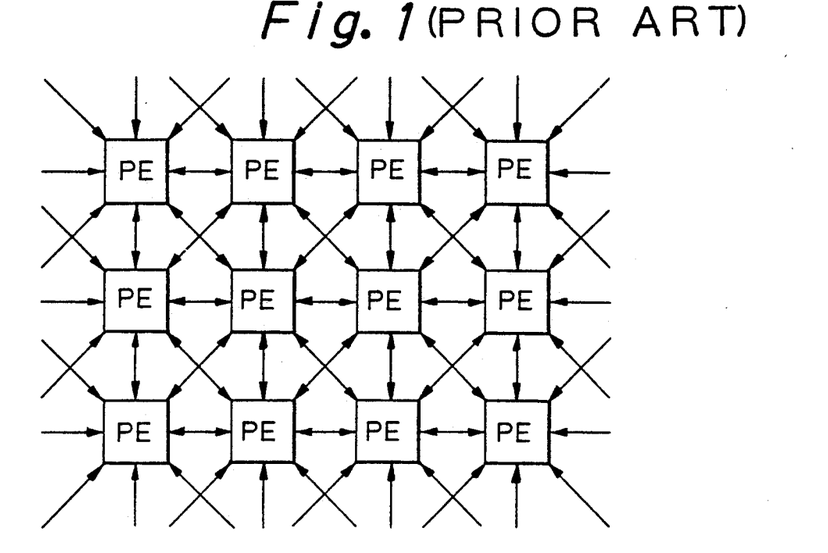
FIG. 1 is a schematic diagram of an image processor according to the prior art

In the systolic array method, a large number of PE's are disposed as shown in FIG. 1, in which adjacent PE's are connected so as to enable communication therebetween. Such prior art has been disclosed in the publication of Japanese Patent Laid-Open No. SHO 56-123069.

Figure 2:
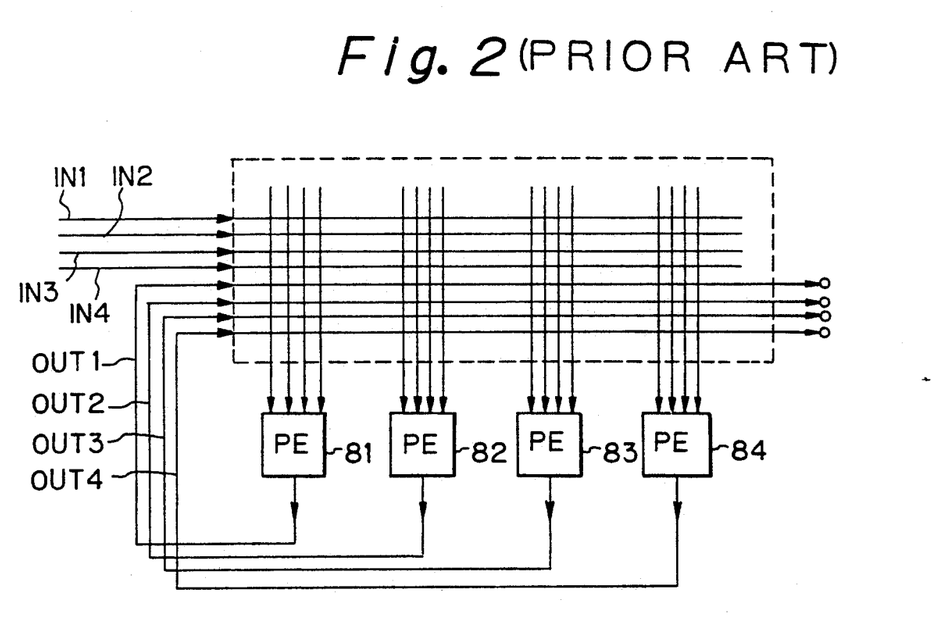
FIG. 2 is a schematic diagram of another image processor according to the prior art.

In the crossbar switch method shown in FIG. 2, on the other hand, inputs IN1 to IN4 and the outputs OUT1 to OUT4 of PE81 to PE84, respectively, intersect the inputs of PE81 to PE84 and each intersection is used as a switch. By changing the connections of PE81 to PEB4 the internal structure of the image processor is varied.

In the image processor using the aforementioned crossbar switch method, to compensate for a delay between processors or between processor inputs, a memory should be disposed in each of PE81 to PE84. Further, a memory for storing a coefficient and a constant is required in each of PE81 to PE84.

Since, in a parallel processing arrangement, each of PE81 to PE84 does not directly access the contents of the memories in other PE's, the memories of PE81 to PE84 may redundantly store the same data.

Further, PE81 to PE84 normally have in the same structure. As a result, when a memory having a relatively large storage capacity is required for any of PE81 to PE84, this large size memory is used for each of PE81 to PE84. Thus, in memories of the processor elements may not be fully utilized, so that unused storage areas in several of the memories are typically present.

Thus, although the structure of the prior art processor can be varied so as to provide flexibility, memory areas are unused and a relatively high amount of circuit redundancy is present. Therefore, the prior art has failed to provide an image processor having adequate flexibility and a minimal amount of circuit redundancy.

OBJECTS AND SUMMARY OF THE INVENTION

Accordingly, it is an object of the present invention to provide an image signal processing circuit which avoids the above-mentioned disadvantages of the prior art. More specifically, it is an object of the present invention to provide an image signal processing circuit having an architecture which enable circuit flexibility and which minimizes circuit redundancy.

According to an aspect of the present invention, an image signal processing apparatus comprises: a plurality of data processing means having respective inputs for receiving data and outputs for outputting data; multiple port memory means having a plurality of addresses with input/output ports at the addresses for writing data therein and for reading data therefrom; and means for connecting the outputs and inputs of the data processing means to the input/output ports at selected ones of the addresses.

The above, and other objects, features and advantages of the present invention will become readily apparent from the following detailed description of preferred embodiments of the present invention when read in conjunction with the accompanying drawings in which corresponding parts are identified by the same reference numerals.

BRIEF DESCRIPTION OF THE DRAWINGS

FIGS. 8A, 8B to 10 are schematic diagrams showing serial connections of processor elements and address areas of the multiple port memory of FIG. 6;

DETAILED DESCRIPTION OF THE PREFERRED EMBODIMENTS

Preferred embodiments of the present invention will now be described with reference to FIGS. 3-15.

Figure 3:
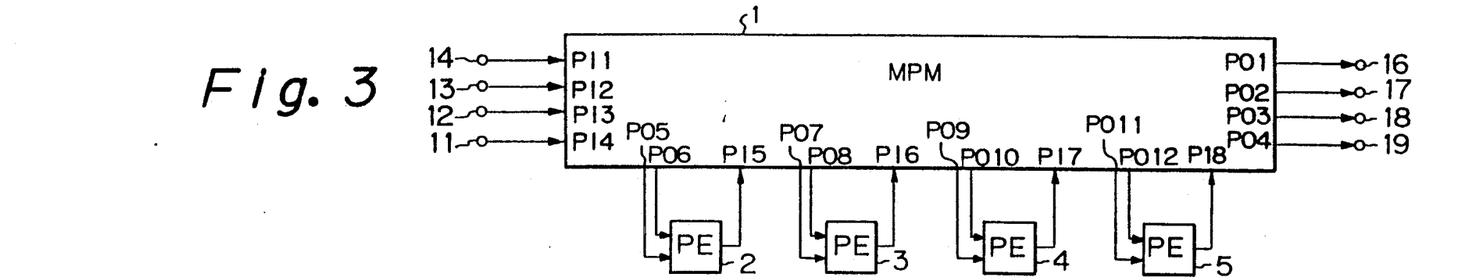
FIG. 3 is a block diagram of an image processor apparatus according to an embodiment of the present invention.

FIG. 3 illustrates a structure having a multiple port memory, which may be disposed at a position where a previously described conventional crossbar switch was disposed, and a plurality of processor elements (PE's) 2 to 5 which are connected to addresses in the multiple port memory 1 as hereinafter described.

The multiple port memory 1 has a total of 20 ports, that is, 12 output ports PO1 to PO12 and 8 input ports PI1 to PI8. As a result, 20 systems can have independent access to the multiple port memory. Thus, when the total number of input ports PI and output ports PO is N, the multiple port memory I can have access to N systems. These input ports PI1 to PI8 and output ports PO1 to P012 are coupled to addresses in the multiple port memory 1 and, as such, are herein considered to be addressed. To provide the necessary addressing, an address generator circuit, an address controller, and so forth (not shown in FIG. 3) are utilized and are hereinafter described.

By controlling the addresses of the multiple port memory 1 as, for example, by controlling the address associated with each port of the multiple port memory, a register, a delay circuit, a buffer memory, a pattern generation circuit, and so forth can be structured using the multiple port memory I as described below in cases 1-4. In the multiple port memory I, two simultaneous data write operations to the same address are prohibited.

(1) Register

In this case, a single address in the multiple port memory i, functions as both a write address ADW and a read address ADR so that a single stage register is connected between the write address and the read address.

(2) Register and delay circuit

In the case where the difference between two addresses ADR and ADW, that is, (ADW-ADR), is fixed, a register having (WA −RA +1) stages can be obtained. More specifically, the two addresses ADW and ADR are generated in order and the address area AR included there between and having m addresses is cycled. As a result, a delay circuit for providing picture element intervals necessary for processing images, for example, a time interval of one horizontal scanning line or a time interval of one frame, can be obtained.

(3) Buffer memory

With respect to the aforementioned case (2), when the difference (ADW−ADR) between the addresses ADR and ADW is not fixed and the addresses do not outrun each other, buffer memory having m stages between the write address ADW and the read address ADR is obtained from the aforementioned difference (ADW−ADR) by using addition with modulo m.

(4) Pattern generation circuit

With respect to the aforementioned case (2), when only the read address ADR, and not the write address ADW, is present, a particular data string is repeatedly read. Thus, a pattern generation circuit for generating a wave form or constant string can be formed. Further, if m=1, for example, a fixed value can be generated.

Figure 4:
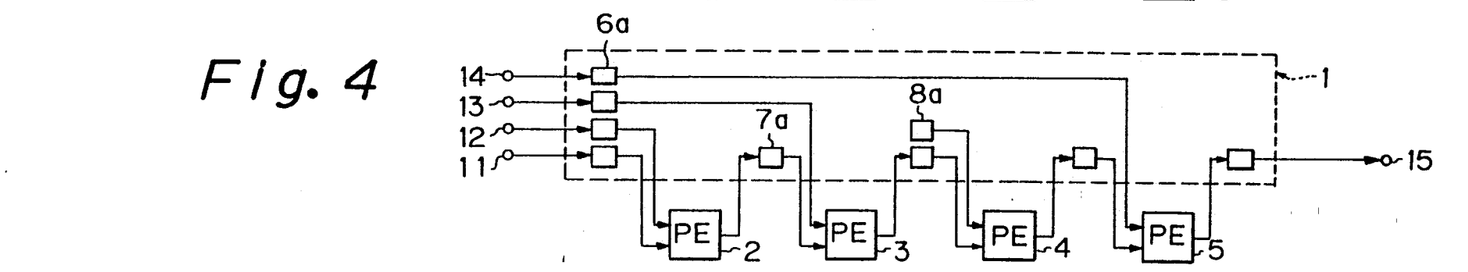
FIG. 4 is a block diagram showing a serial connection of processor elements of the apparatus of FIG. 3.
Figure 5:
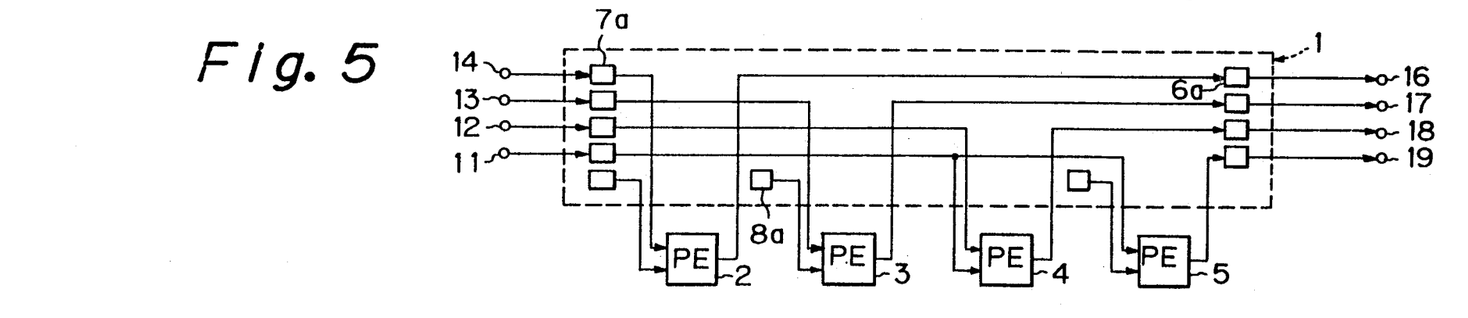
FIG. 5 is a block diagram showing a parallel connection of processor elements of the apparatus of FIG. 3.

Depending on the combination of the aforementioned address control methods utilized, PE2 to PE5 may be connected as shown in FIG. 4 or FIG. 5.

FIG. 4 shows an example of a serial connection of PE2 to PE5 using the multiple port memory, in which the block 6a is a buffer memory in accordance with case (3); the block 7a is a delay circuit in accordance with case (2); and the block 8a is a constant string generation circuit in accordance with case (4).

FIG. 5 shows an example of a parallel connection of PE2 to PE5 using the multiple port memory 1 in which the blocks 6a, 7a, and 8a have the same functions as those described with reference to FIG. 4.

By a combination of connections as, for example, shown in FIGS. 4 and 5, the operational states, of PE2 and PE5 can be readily changed. Further, in FIGS. 4 and 5, the address of each block is an address space in the multiple port memory 1 and should be assigned a separate area. In other words, when a particular block address has a range from address L to address ml, another block address should not be in the range of [L1 to (L1+ml−1)].

When the processor is used in a particular system which requires a predetermined structure, the aforementioned condition should be considered and determined by a compiler.

Thus, in the aforementioned structure, PE2 to PE5 can be readily connected to multiple port memory 1 such that the input and output between PE2 to PE5 or the inputs and outputs of each PE can be readily delayed, buffer memory 6 can be formed, and/or fixed data can be generated. Moreover, since the multiple port memory 1, may be utilized with each processor element, that is PE2 to PE5, it is not necessary to provide a memory for each PE. As a result, data for use with PE2 to PE5 may be stored in the multiple port memory 1, thus preventing data from being redundantly stored in the processor elements. Further, the memory size of the multiple port memory 1 may be less than the total memory required in the previously described prior art image processor in which each PE has the same size memory and that size is selected to accommodate the largest PE memory requirement.

Thus, the above described embodiment utilizes a multiple port memory in various methods. However, as will be appreciated, when the number of ports is increased, the number of wires connected thereto is accordingly increased. As a result, the area of the memory chips is increased which decreases the efficiency in which the structure may be packaged.

To avoid such problems, the multiple port memory may include a random access memory (hereinafter RAM) which has serial access ports. A second embodiment of the present invention which utilizes a RAM will now be described with reference to FIGS. 6-15.

Figure 6:
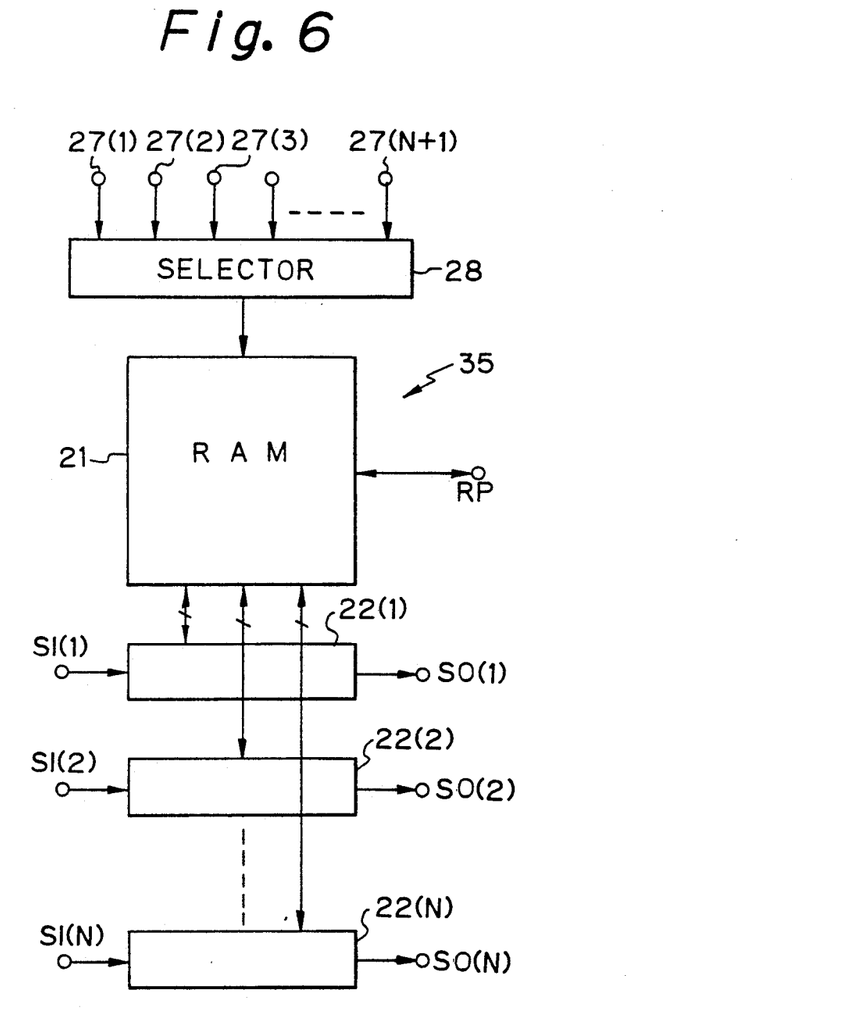
FIG. 6 is a block diagram of a multiple port memory for use in an image processor apparatus according to another embodiment or the present invention.

FIG. 6 illustrates a multiple port memory 35 which includes a selector 28, a RAM 21 having a random access port RP and a plurality of serial circuits 22 having a set of serial access ports SI (1) to SI (N) and SO(1) to SO(N) and which are connected in parallel to the RAM 21.

In the multiple port memory 35, (N+1) ports, that is, N serial access ports SI(1) to SI(N) and SO(1) to SO(N) and one random access port RP, should be addressed. The random access port RP and the serial access ports SI(1) to SI(N) and SO(1) to SO(N) differ in the access method, namely, whether the access method is random or serial, rather than in the number of bits. Further it is to be appreciated that, when the serial access ports SI(1) to SI(N) and SO (1) to SO(N) are respectively connected together, they are input/output (I/O) ports.

An address signal supplied from terminals 27(1) to 27 (N+1) is selected by selector 28 and thereafter supplied to RAM 21. The RAM 21 reads the data which corresponds to the address signal supplied from the selector 28 and sends the data to the serial circuits 22(1) to 22 (N). Thereafter, the data are output from the corresponding serial access ports SO(1) to SO(N).

In the RAM 21, the serial access address may be interrupted for a random access cycle. Further, while the serial circuits 22(1) to 22(N) are being accessed, the addresses of the serial access ports SI(1) to SI(N) and SO(1) to SO(N) are not utilized. Thus, an address conflict between the random access port Rp and the serial access ports SI(1) to SI(N) and SO(1) to SO(N) is avoided.

In the structure shown in FIG. 6, when the serial access ports SI(1) to SI(N) and SO(1) to SO(N) are used, there is a possibility that the desired addressing cycle may be delayed for N cycles. However, when the data amount processed in the serial access ports SI(1) to SI(N) and SO(1) to SO(N) is compared with the cycle number N, if the data amount is larger than the cycle number N, the process of the processor is not delayed. On the other hand, to accommodate such delay, the serial access ports SI(1) to SI(N) and SO(1) to SO(N)

are provided with a functional means (not shown) for waiting N cycles.

The serial access ports SI(1) to SI(N) and SO(1) to SO(N) can only access serial data at a relatively high speed. Nevertheless, when the signal to be processed is a raster scanned image signal, the relatively high access speed does not present a problem. Further, in a 2-dimensional block having image data, a signal obtained by horizontally scanning along the width direction can be serially accessed. Furthermore, when the serial circuits 22(1) to 22(N) are increased, the required area of the integrated circuit (IC) is also increased. For example, one new port may require approximately 10% more memory capacity. While such an increase in memory capacity cannot be ignored, this increase of the memory capacity can be justified in view of the aforementioned benefit. Further, when using the multiple port memory 35, the number of external connections may be increased. However, by forming the multiple port memory 35 into an IC, size and connection problems are normally avoided.

Figure 7:
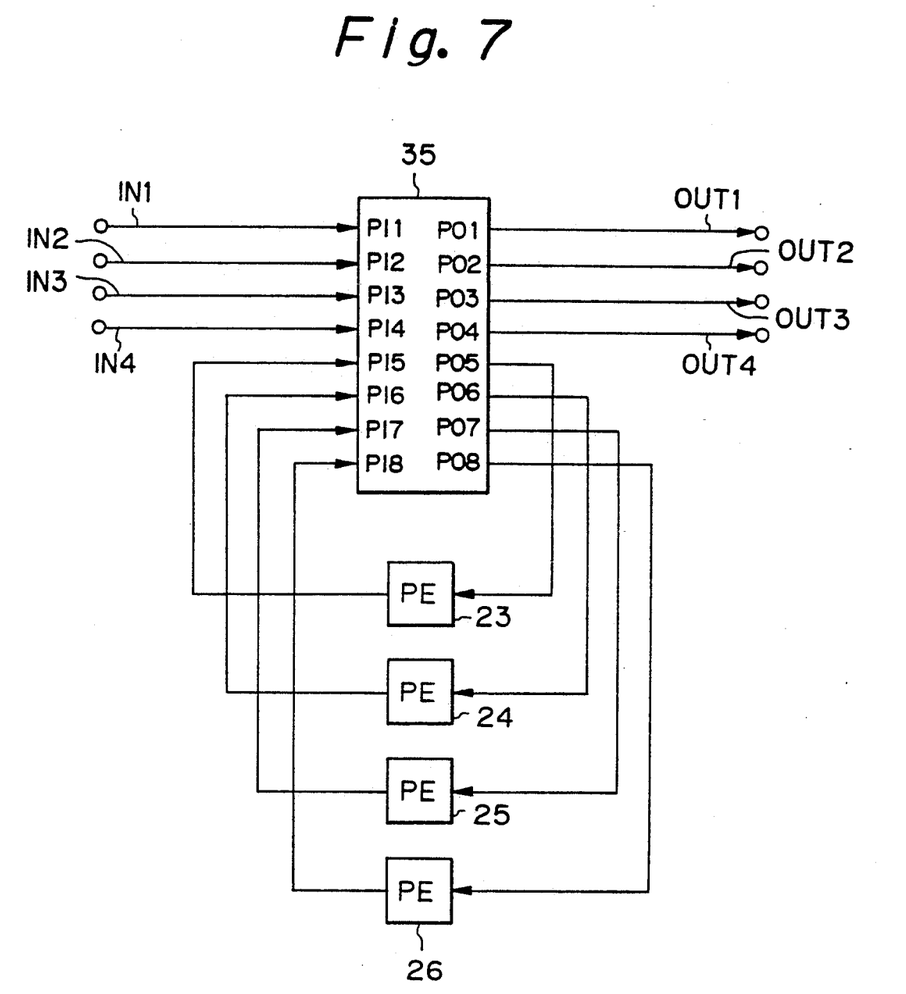
FIG. 7 is a block diagram of an image processor apparatus showing the connection of the multiple port memory of FIG. 6 and processor elements, according to another embodiment of the present, invention.

FIG. 7 shows an image signal processing circuit using the multiple port memory 35, which includes the RAM 21 and the serial circuits 22(1) to 22(N) shown in FIG. 6. In FIG. 7, the reference symbols IN1 to IN4 are external inputs; OUT1 to OUT4 are external outputs; 23 to 26 are PE's; PI1 to PI8 are input ports; and PO1 to PO8 are output ports.

The multiple port memory 35 used in the processing circuit of FIG. 7 has 16 serial circuits 22 any of which serial circuits may use either the associated serial access port SI or SO. It is to be appreciated that the present embodiment is not limited to using a multiple port memory with 16 serial circuits, but may instead use a multiple port memory with a different number of serial circuits.

In the multiple port memory 35, N sets of I/O ports as serial access ports SI and SO controlled at the same address are formed. If only input ports or output ports are required, the other of the serial access ports SI or SO are not used. The sets of the serial access ports SI and SO can be used as I/O terminals in common or as discrete input or output terminals. By controlling the write address ADW and the read address ADR of the multiple port memory 35, the functions described in Case Nos. (1) to (4) in the first embodiment can be accomplished.

Figure 8A:
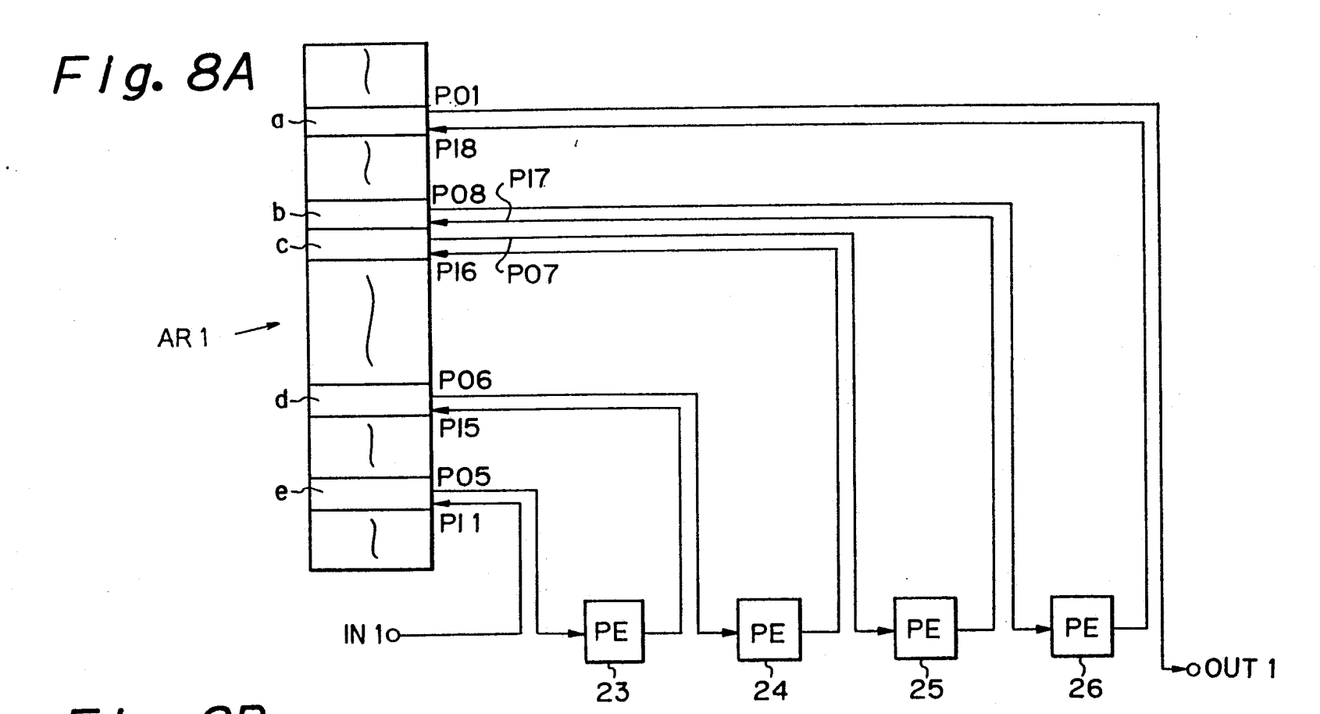
Figure 8B:
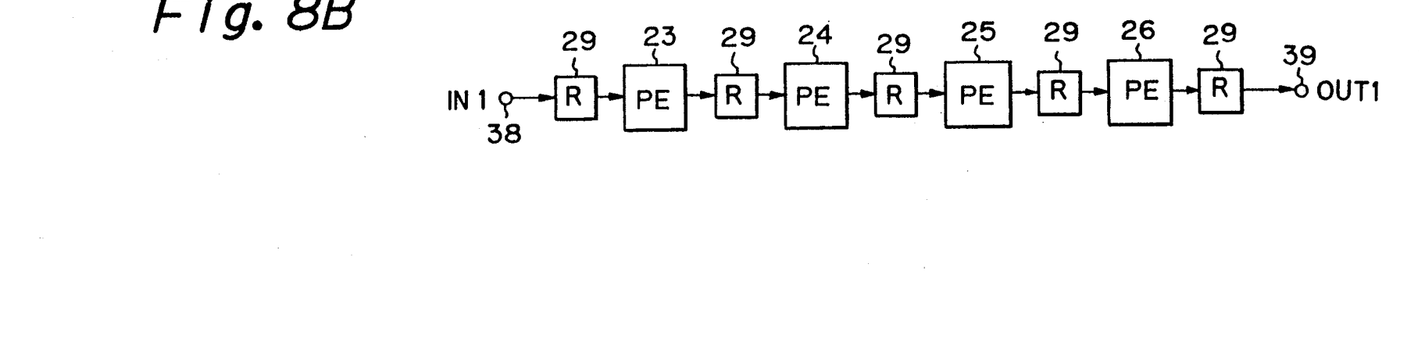

FIGS. 8A and 8B show a connection of PE23 to PE26 through a register in accordance with the previously described function of case No. (1).

Unique addresses (a) to (e) are selected in an address area AR1 of the multiple port memory 35 as shown in FIG. 8A. As shown therein, the input port PI1 and the output port PO5 are fixed to the address (e). Likewise, the input port PI5 and the output port PO6 are fixed to the address (d); the input port PI6 and the output port PO7 are fixed to the address (c); the input port PI7 and the output port PO8 are fixed to the address (b); and the input port PI8 and the output port PO1 are fixed to the address (a).

In the aforementioned structure, as shown in FIG. 8B, PE23 to PE26 are serially connected through on stage of register 29 which, in turn, is formed in each of the addresses (a) to (e). Thus, the function of the previously described case No. (1) can be accomplished. In FIG. 8B, the reference numerals 38 and 39 represent input and output terminals respectively.

Figure 9:
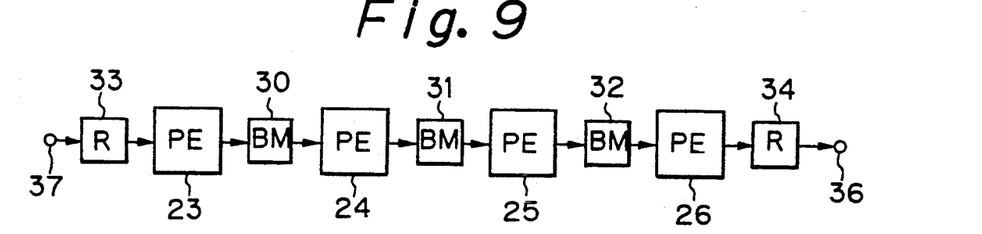

Thus, the structure shown in FIG. 8 is a simple serial connection in accordance with Case No. 1. However, a delay circuit, buffer memory, and so forth may be required to be inserted between PE23 to PE26 or between the I/O ports. In these as previously described in Case Nos. (2) and (3), it is necessary to have address areas in accordance with the delay circuit, buffer memory, and so forth between PE23 and PE26 and to cycle the address areas. An example of a structure for disposing buffer memories 30 to 32 between PE23 to PE26 is shown in FIG. 9. In FIG. 9, the reference numerals 33 and 34 are registers and the reference numerals 36 and 37 are terminals.

Generally, when buffer memories are disposed in several locations, it is necessary to determine the memory size required for each buffer memory in a worst case condition. However, in the following structure, it is not necessary to consider such memory size.

Figure 10:
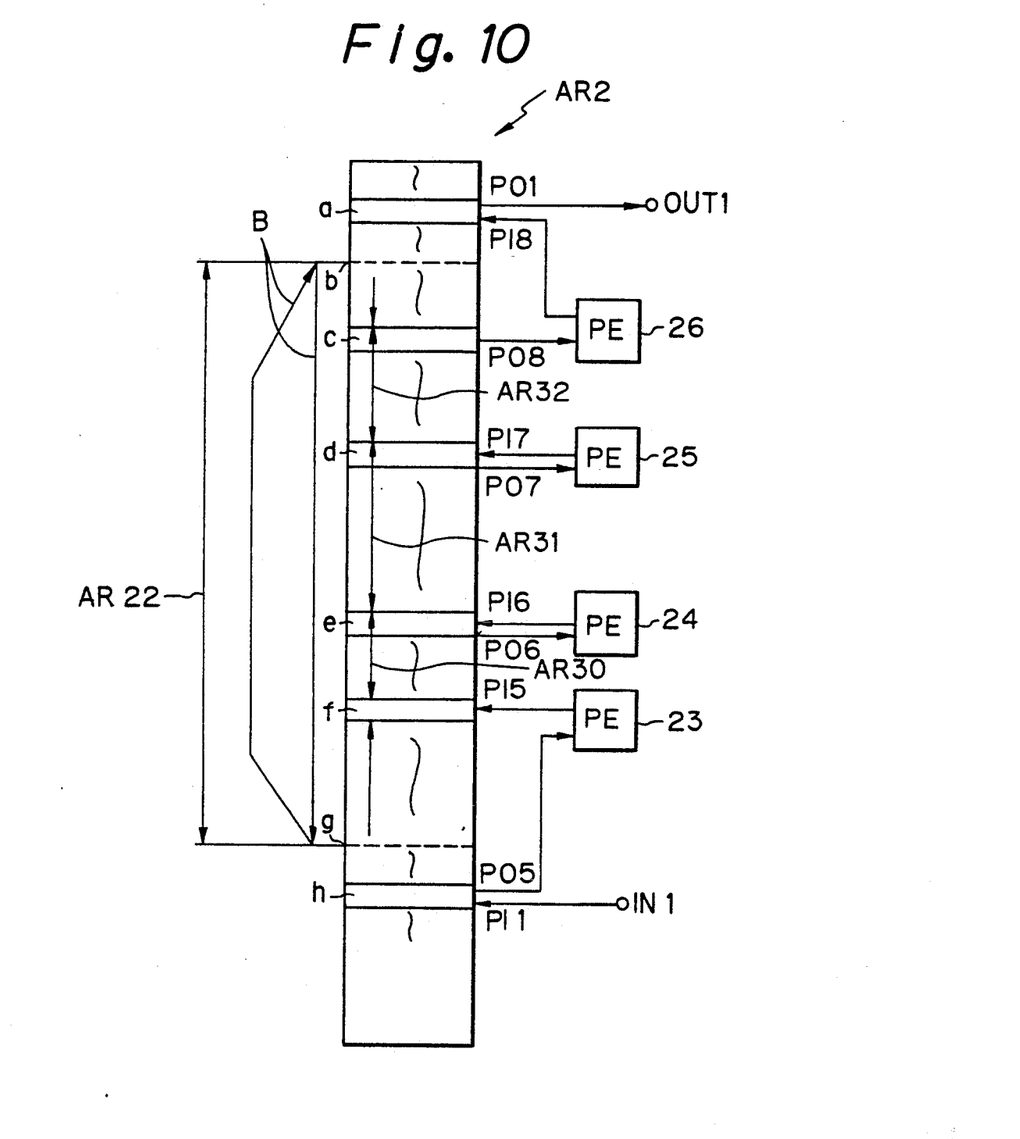

As shown in FIG. 10, in the address area AR2 for the multiple port memory 35, the address (b) to address (g) are established or set to include the address areas for the buffer memories 30 to 32. More specifically, between the address (b) and the address (g) is the address (f) for the input port PI5, the address (e) for the input port PI6 and the output port PO6, the address (d) for the input port PI7 and the output port PO7, and the address (c) for the output port PO8.

Address (b) to the address (g) in address area AR22 is cycled as shown in FIG. 10 by the arrow marked B, such that the addresses (c), (d), (e), and (f) are incrementally moved. However, the cycle operation should be controlled so that the address areas AR30, AR31, and AR32 of the respective buffer memories 30 to 32, as expressed by the following equations, should not be "0":

$$AR30 = f - e$$

$$AR31 = e - d$$

$$AR32 = d - c$$

Such a controlled cyclic operation can be accomplished by monitoring the outrun of the addresses.

By proper selection of the address areas AR30 to AR32, the memory size of the multiple port memory 35 can be made smaller than the sum of the memory sizes of conventional buffer memories. Further, when an image signal is pipeline-processed, the average signal flow in the pipe becomes constant. As a result, when the signal flow of a part of the buffer memories connected in series is larger than the signal flow in other parts the flow in the other parts becomes proportionately smaller. Thus, a signal flow having a constant average is maintained so as to produce satisfactory results. In FIG. 10, the reference symbol (a) is a register 33, which is the address of the input port PI8 and the output port PO1; and the reference symbol (h) is a register 34, which is the address of the input port PI1 and the output port PO5.

The buffering operation shown in FIG. 10 acts as a countermeasure against the previously described possibility in which the addressing of the multiple port memory 35 is delayed for a number of cycles according to the number of ports. The addresses (e) and (d) shown in FIG. 10 have input and output ports PI6, PO6 and PI7, PO7, respectively. Further a precondition for this structure is that the read operation is followed by the write operation. To remove the need for such precondition, it is necessary to separate the address (d) from the address (e) by one or more addresses.

Figure 11:
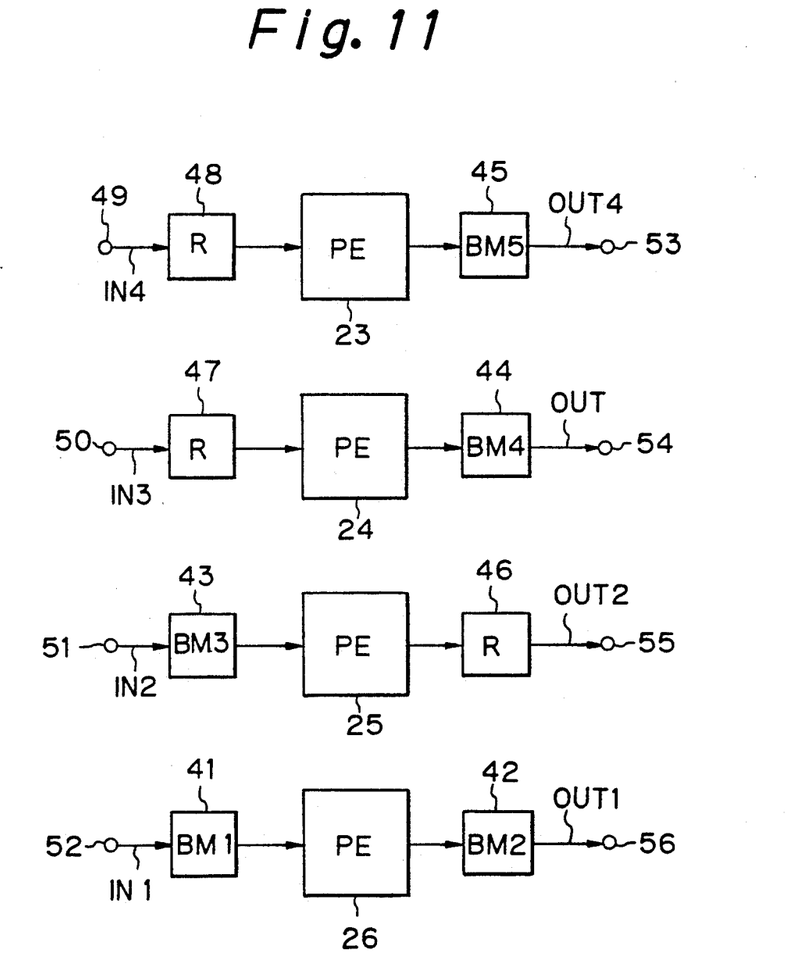
FIGS. 11 to 14 are schematic diagrams showing parallel connections of processor elements and address areas of the multiple port memory of FIG. 6.
Figure 12:
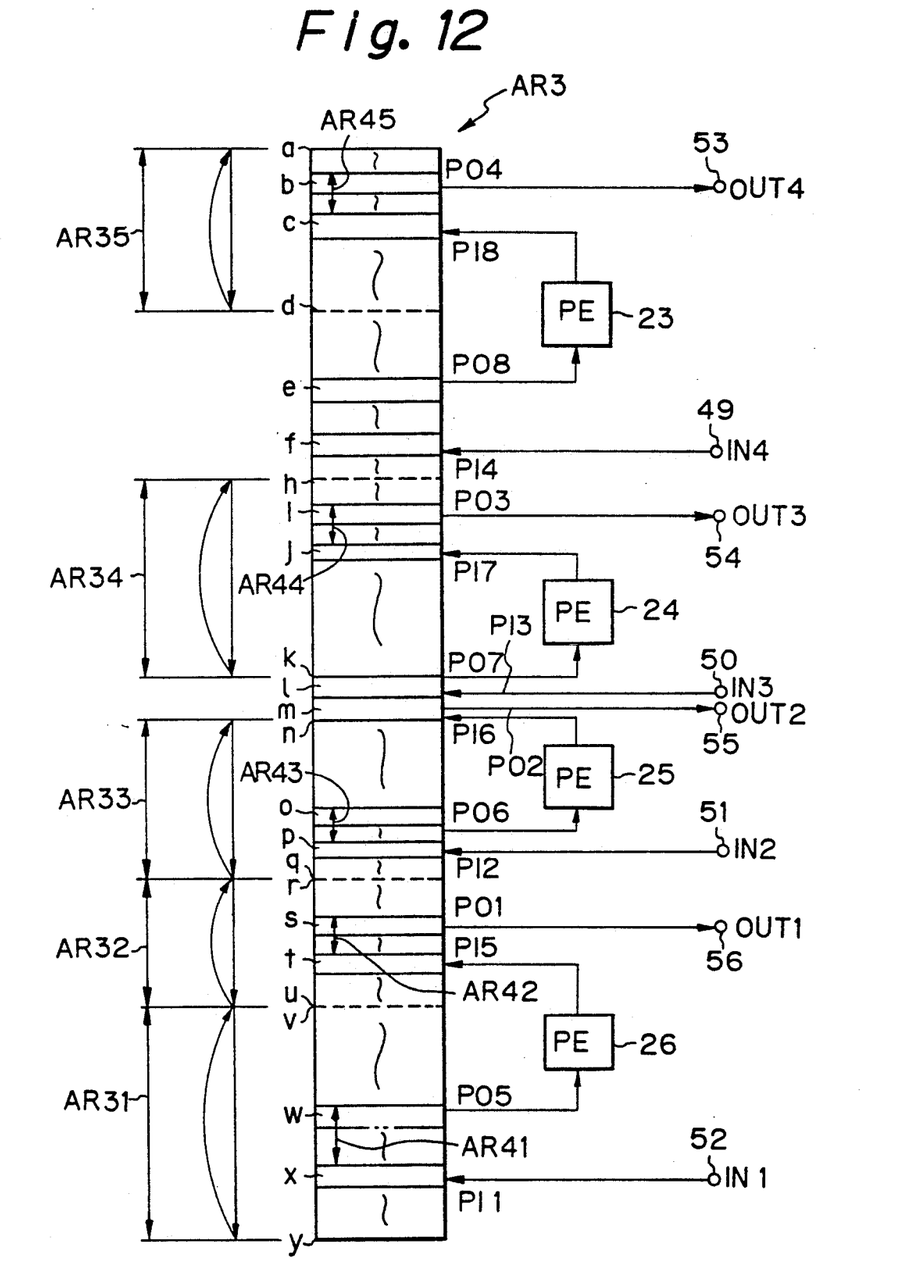

FIG. 11 shows a structure having a parallel connection of PE23 to PE26. FIG. 12 shows the structure of FIG. 11 in the address area AR3 of the multiple port memory 35. As shown in FIG. 11, all buffer memories 41 to 45 are discretely used. In FIG. 11, the reference numerals 46 to 48 represent registers and, in FIGS. 11 and 12, the reference numerals 49 to 56 represent terminals.

As shown in FIG. 12, in the address area AR3 (FIG. 12), an address area AR31 having addresses (v) to (y) is set to the buffer memory 41; an address area AR32 having addresses (r) to (u) is set to the buffer memory 42; an address area AR33 having addresses (n) to (q) is set to be the buffer memory 43; an address area AR34 having addresses (h) to (k) is set to the buffer memory 44; and ad address area AR35 having addresses (a) to (d) is set to the buffer memory 45. In FIG. 12, the reference symbols (x) and (w) represent addresses which are set for an address area AR41 of the buffer memory 41 and which are moved in succession. Likewise, the reference symbols (t) and (s) are addresses which are set for an address area AR42 of the buffer memory 42 and which are moved in succession; the reference symbols (p) and (o) represent addresses which are set for an address area AR43 of the buffer memory 43 and which are moved in succession; the reference symbols (j) and (i) represent addresses which are set for an address area AR44 of the buffer memory 44 and which are moved in succession; and the reference symbols (b) and (c) represent addresses which are set for an address area AR45 of the buffer memory 45 and which are moved in succession. Further, the address (m) represents the register 46; the address (l) represents the register 47; and the addresses (e) and (f) represent the register 48.

The addresses (x), (w), (t), (s), (p), (o), (j), (i), (b) and (c) are controlled so that the address differences expressed by (x−w), (t−s), (p−o), (j−i), and (c−b) and also the differences (m−l) and (f−e) do not become 0, in other words, so that no outrun takes place.

Figure 13:
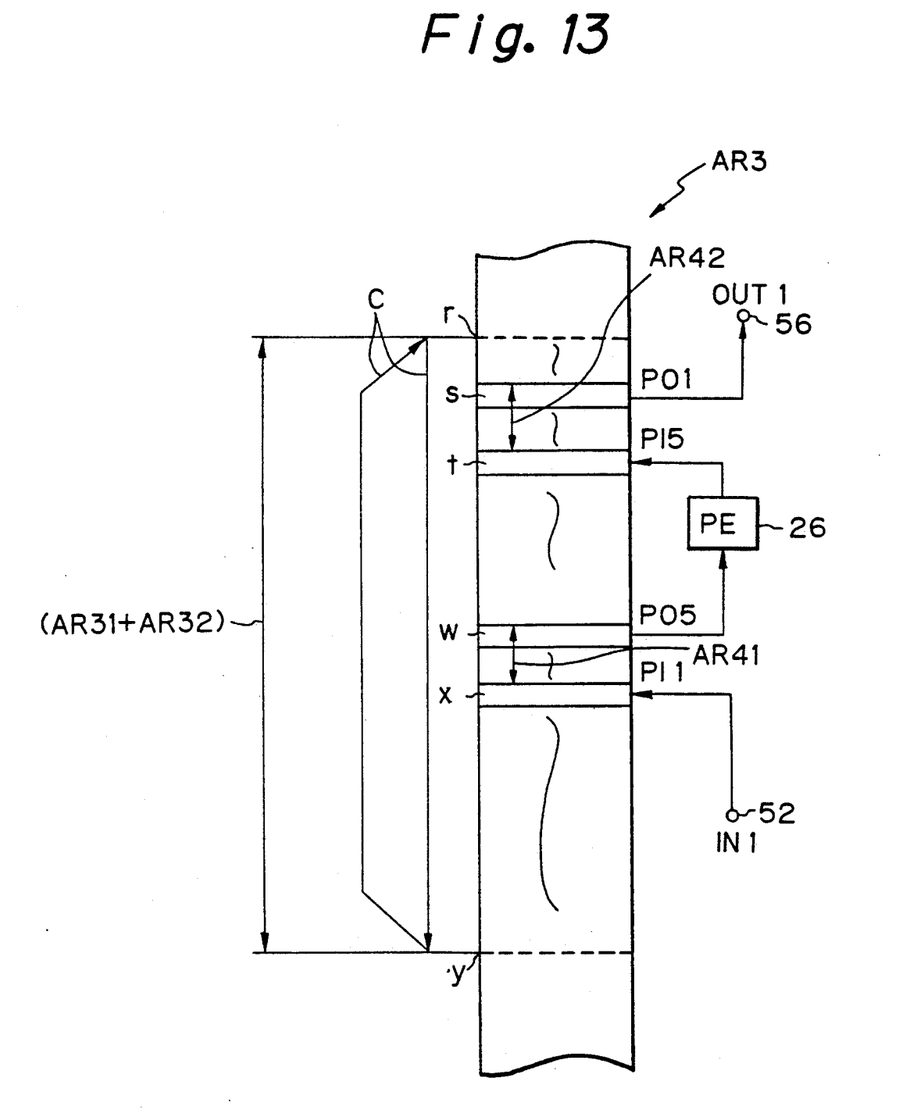
Figure 14:
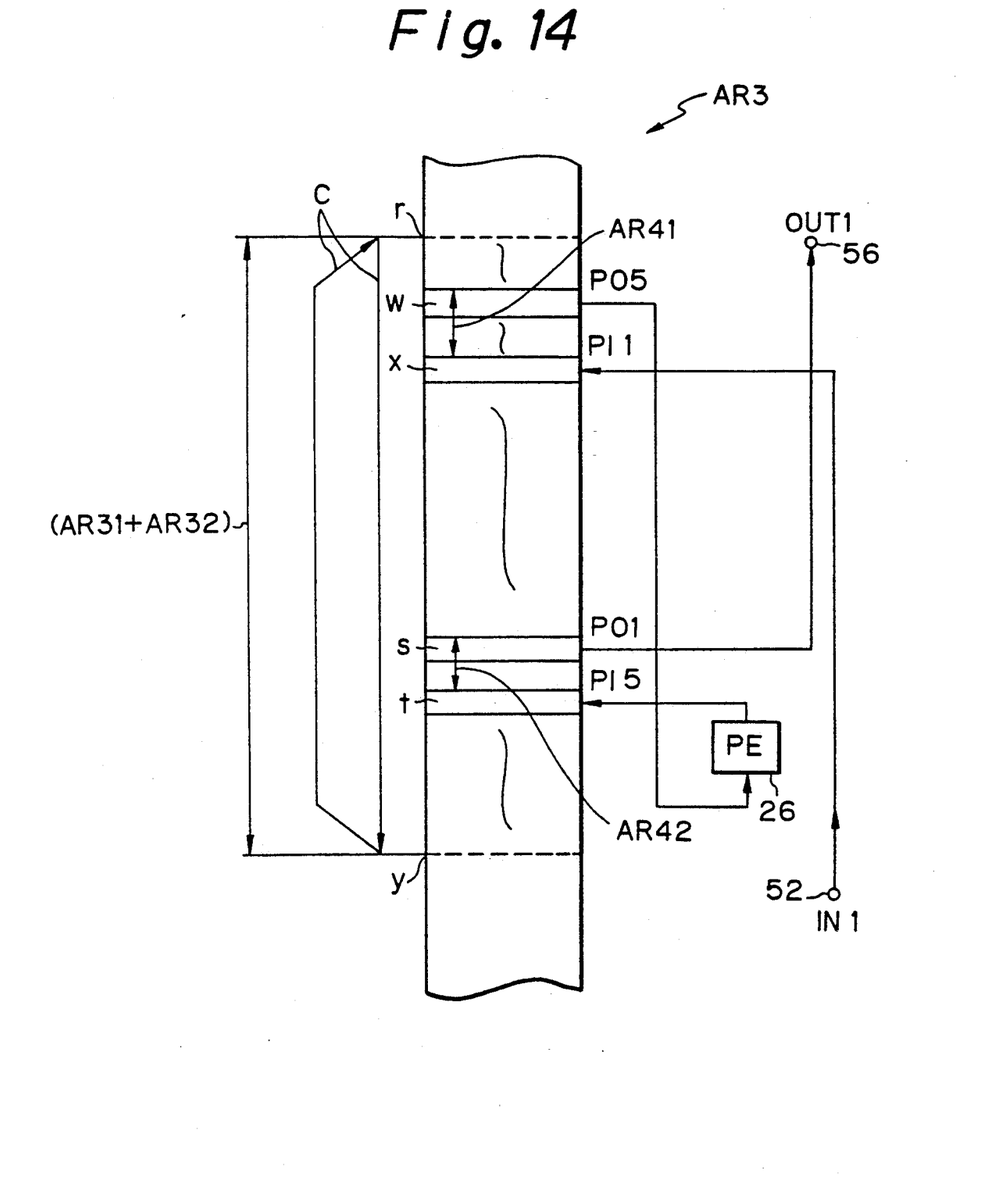

FIG. 13 illustrates the state of a portion of the address area AR3 just after the system is activated. The addresses (x), (w), (t), and (s) of the I/O ports PI1, PO5, PI5 and PO1, respectively, are cycled in the address areas [AR31 +AR32] as shown by the arrow C. Thus, the addresses (x), (w), (t), and (s) are cycled in ascending order from the lowermost address (r) to the uppermost address (y) and upon obtaining the uppermost address (y), the respective address returns to the lowermost address (r). FIG. 14 illustrates the addresses (x), (w), (t), and (s), of the I/O ports PI1 and PO5 and the I/O ports PI5 and PO1 in the address areas [AR3-1+AR32] after a predetermined amount of cycling.

More specifically, the addresses (x) and (w) of the input port PI1 and the output port PO5, respectively, are incrementally moved from the uppermost address, for example, the address (y), to the lowermost address, for example, the address (r). On the other hand, the address (t) of the input port PI5 and the address (s) of the output port PO1 are incrementally moved from the lowermost address (r) to the uppermost address (y). As previously described, when an address moves to the uppermost address (y), it thereafter returns to the lowermost address (r). Thus, from FIG. 13 to FIG. 14, the addresses (x) and (w) have moved to the lowermost address (r), while the addresses (t) and (s) have moved to the uppermost address (y).

The address control for each I/O port of the multiple port memory 35 of FIG. 6 can be accomplished by utilizing an address generator as hereinafter described.

The operation of the address generator may be controlled in accordance with the following rules:
(1) Basically increment the address by 1.
(2) Increment the address at intervals of particular steps which are useful in digital signal processing.
(3) Roll over the address from the uppermost address to the lowermost address to prevent it from deviating out of a designated range.
(4) When the designated range is overlapped with another designated range by another address generator, the later should not outrun the former.
(5) When the system is reset or started up, move the address from the lowermost address.

Figure 15:
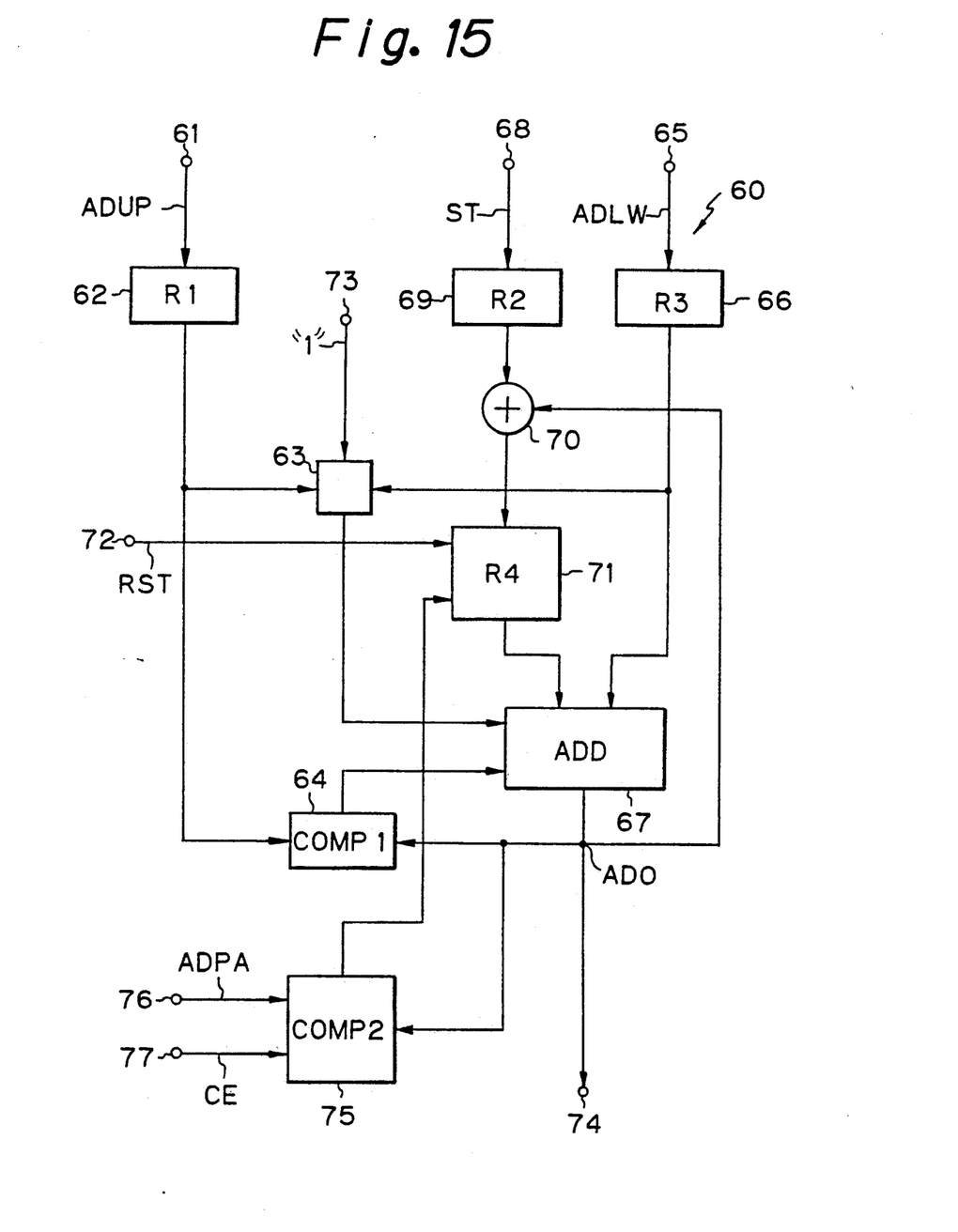
FIG. 15 is a block diagram of an address generator.

An example of an address generator 60 will now be described with reference to FIG. 15.

The uppermost address ADUP is supplied from a terminal 61 to a composite circuit 63 and a comparator 64 through a latch 62. The lowermost address ADLW is supplied from a terminal 65 to composite circuit 63 and an adder 67 through a latch 66. A step ST, for example, ST=1, is supplied from a terminal 68 to an adder 70 through a latch 69. An address value AD0 from the adder 67 is fed back to the adder 70. The adder 70 adds the present address value AD0 to the step ST from latch 69 and the resultant value is then latched by a latch 71.

The latch 71 structures an accumulator along with the adder 70. When the system is started up, an initial reset signal RST is supplied to the latch 71 through a terminal 72, so as to clear the contents of the latch 71. The output from the latch 71 is supplied to the adder 67.

Composite circuit 63, adds the lowermost address ADLW and the uppermost address ADUP supplied from the latches 66 and 62, respectively, and a value of "1" supplied from a terminal 73. Thus, the value [uppermost address ADUP +lowermost address ADLW +1] is obtained in composite circuit 63 and is then supplied to the adder 67.

The adder 67 is a modulo adder for performing modulo addition on the value [upper most address ADUP +lowermost address ADLW+1] so as to obtain the address value ADO. The adder 67 outputs the address value AD0 obtained by means of the modulo addition to a terminal 74. As was previously described, when the system is started up, the contents, of the latch 71 are cleared and, as a result, the lowermost address ADLW is output as the address value AD0. The address value which is output from the adder 67 is also supplied to the comparators 64 and 75.

The comparator 64 compares the uppermost address ADUP with the address value AD0 so as to determine whether or not the address value AD0 exceeds the uppermost address ADUP. As a result, a signal is supplied from the comparator 64 to the adder 67 which provides an instruction for executing the previously described modulo operation.

The comparator 75 compares an address ADPA of another I/O port supplied from a terminal 76 with the address value AD0 so as to determine whether or not an outrun will occur. If it is determined that an outrun will occur, the comparator 75 outputs a control signal to the latch 71 whereupon the contents of the latch 71 are held and the accumulator is stopped. When the number of I/O ports is N, the comparator 75 compares (N−1) sets. However, in the same address area, the comparator compares the address of the preceding I/O port and, as such, the comparator compares one set.

A control signal CE supplied from a terminal 77 stops the operation of the comparator 75 when no I/O port is designated in the same address area.

According to the above described embodiments of the present invention since either multiple port memory 1 or 35 may be commonly used by each PE, it is not necessary to provide each PE with a memory. As a result, since the memory may be commonly used, redundancy of data may be prevented. Further, the memory size of the multiple port memory 1 or 35 may be smaller than the sum of the memory sizes of the conventional PE's as previously described.

In addition, the connection state of the PE's can be varied so as to obtain high flexibility. Further, circuit redundancy can be decreased, as previously described. Thus, a system having an architecture which provides circuit flexibility and which minimizes circuit redundancy can be accomplished.

Although the aforementioned embodiments have been described as having either serial or parallel connections of PE's, it is to be appreciated that the present invention is not so limited and may be incorporated in a circuit having its PE's connected in a serial and parallel arrangement. Further, the number of inputs of each PE is not limited to 1.

Although, in the above mentioned embodiments, the multiple port memory 1 or 35 was described as being used for data and the operation and effect thereof were also described, the invention is not limited to use of a program memory, a table memory, or the like.

In addition, by disposing a plurality of serial circuits and a plurality of serial access ports in a RAM, the structure of the multiple port memory is prevented from being relatively large and complicated.

Although preferred embodiments of the present invention and various modifications have been described in detail herein, it is to be understood that this invention is not limited to the specifically described embodiments and modifications and that other modifications and variations may be effected therein by one skilled in the art without departing from the spirit and scope of the invention as defined by the appended claims.

What is claimed is:

1. An image signal processing apparatus comprising:
   a plurality of data processing means having respective input ports for receiving data and output ports for outputting data;
   multiple port memory means for providing all data storage functions for said plurality of data processing means, said multiple port memory means having a plurality of addresses and a plurality of input/output ports;
   coupling means for selectively coupling each of said input/output ports of said multiple port memory means with at least one of said addresses to enable writing of data to said addresses and reading of data from said addresses; and
   means for respectively connecting each one of said output ports and each of one of said input ports of said detail processing means to selected ones of said input/output ports of said multiple port memory means.

2. An image signal processing apparatus according to claim 1, wherein at least one of said output ports and at least one of said input ports of at least one of said data processing means are connected to one of said input/output ports of said multiple port memory means coupled to one of said addresses.

3. An image signal processing apparatus according to claim 1, wherein said coupling means restricts at least one of said addresses in said multiple port memory means to an address area bound by a first address and by a second address, and in which said coupling means cycles said addresses in said address area between said first address and said second address while distances between said addresses in said address area remain constant.

4. An image signal processing apparatus according to claim 1, wherein said coupling means restricts at least one of said addresses in said multiple port memory means to an address area bound by a first address and by a second address, and in which said coupling means cycles said addresses in said address area between said first address and said second address while varying distances between said addresses in said address area so that variations in said distances are within predetermined distances.

5. An image signal processing apparatus according to claim 1, wherein data stored in said multiple port memory means in an address area bound by a first address and by a second address are repeatedly read therefrom.

* * * * *